April 24, 1945. A. W. KEUFFEL ET AL 2,374,356
METHOD AND APPARATUS FOR PREPARING HIGHLY LEGIBLE TAPES
Filed June 8, 1939 3 Sheets-Sheet 1
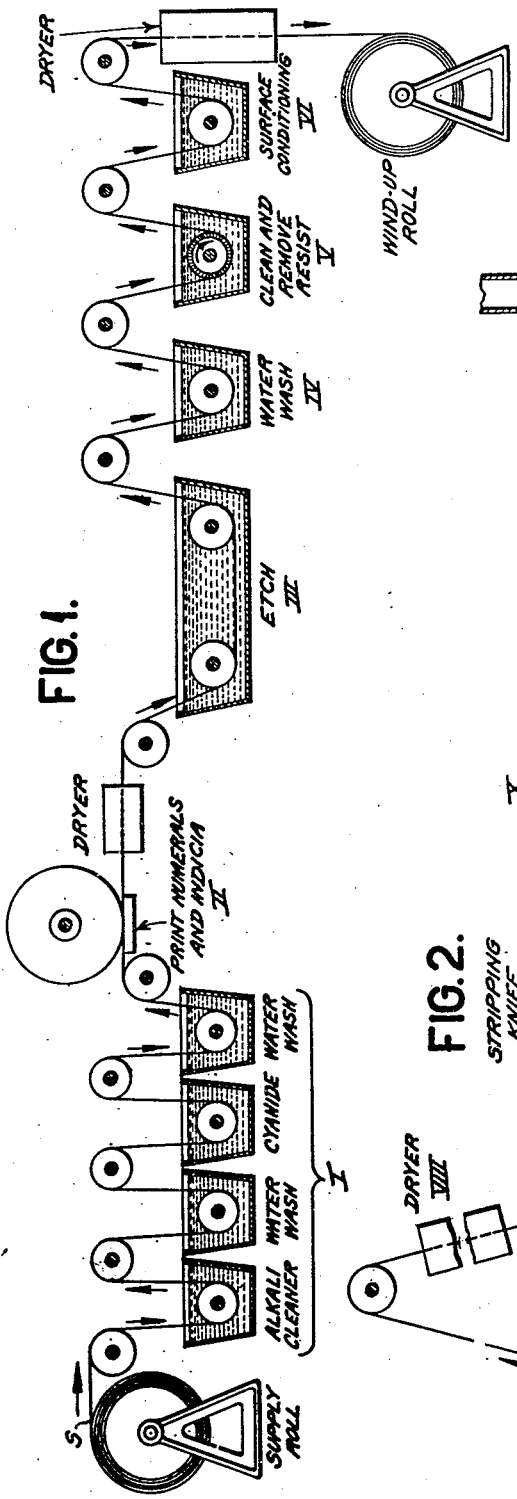
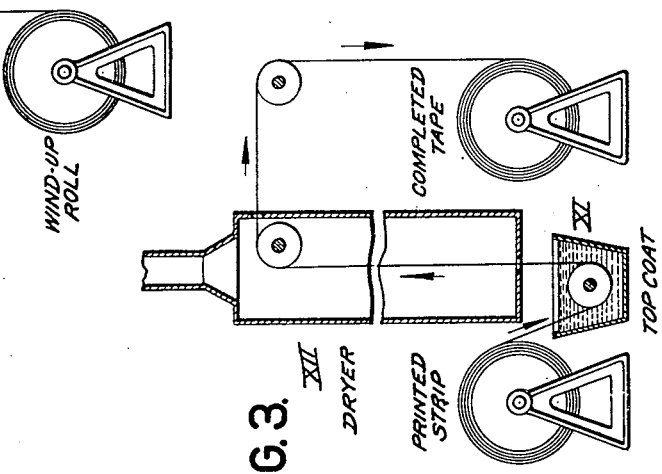
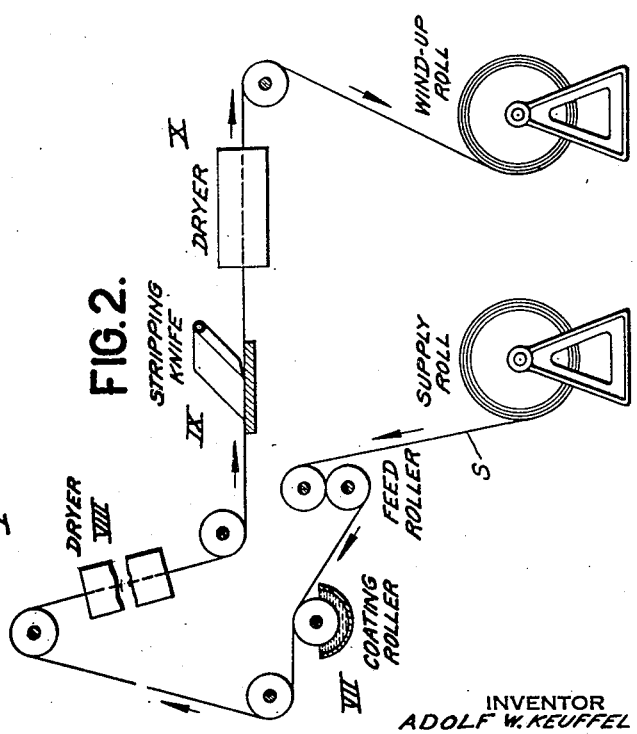
INVENTOR
ADOLF W. KEUFFEL
HOWARD F. SCHERMERHORN
BY
ATTORNEYS April 24, 1945.  A. W. KEUFFEL ET AL  2,374,356
METHOD AND APPARATUS FOR PREPARING HIGHLY LEGIBLE TAPES
Filed June 8, 1939  3 Sheets-Sheet 2
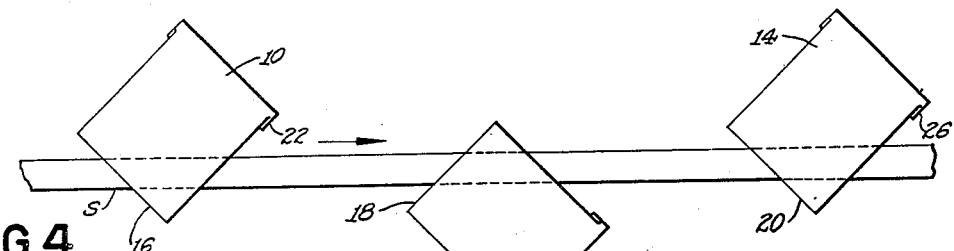
FIG.4.
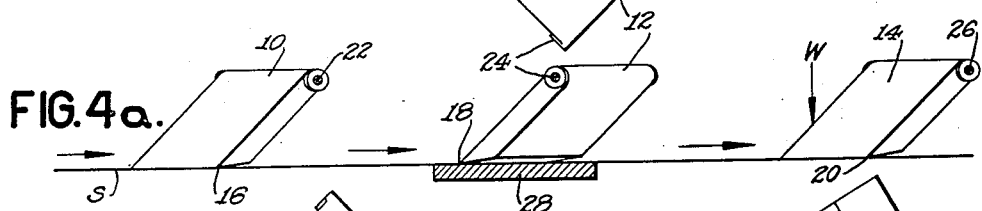
FIG.4a.
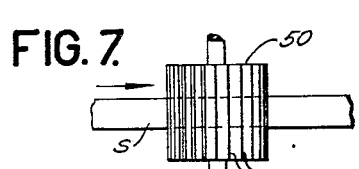
FIG.5.
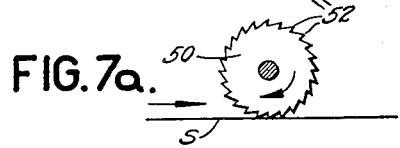
FIG.5a.
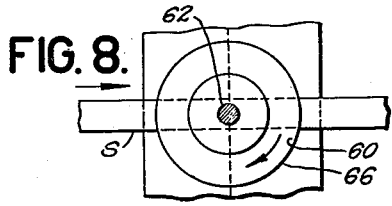
FIG.6.
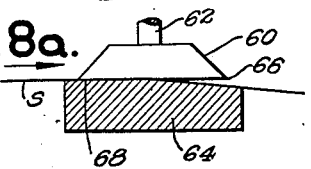
FIG.6a.
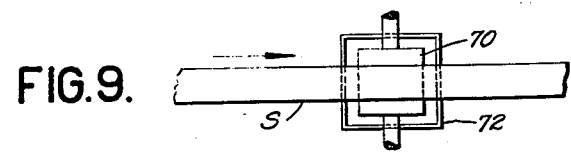
FIG.7.
FIG.7a.
FIG.8.
FIG.8a.
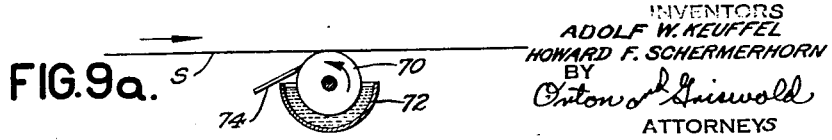
FIG.9.
FIG.9a.
INVENTORS
ADOLF W. KEUFFEL
HOWARD F. SCHERMERHORN
BY
ATTORNEYS April 24, 1945.  A. W. KEUFFEL ET AL  2,374,356
METHOD AND APPARATUS FOR PREPARING HIGHLY LEGIBLE TAPES
Filed June 8, 1939  3 Sheets-Sheet 3

INVENTOR
ADOLF W. KEUFFEL
HOWARD F. SCHERMERHORN
BY
Orton and Griswold
ATTORNEYS Patented Apr. 24, 1945

2,374,356

UNITED STATES PATENT OFFICE 2,374,356

METHOD AND APPARATUS FOR PREPARING HIGHLY LEGIBLE TAPES

Adolf W. Keuffel and Howard F. Schermerhorn, Montclair, N. J., assignors to Keuffel & Esser Company, Hoboken, N. J., a corporation of New Jersey Application June 8, 1939, Serial No. 278,014

18 Claims. (Cl. 41—1)

This invention relates to a method and apparatus for making measuring tapes, rules and other scales of the kind used by engineers, surveyors, carpenters, builders, carpet layers, and others to measure distances, either horizontal or vertical, indicators and the like with highly legible permanent indicia.

The invention particularly relates to a method and also apparatus for preparing a highly legible graduated metal tape with permanent graduations comprising a metal strip with portions thereof etched according to a pattern of the graduations forming depressions from the normal surface of the strip and a pigmented coated material filling said depressions to contrast with the normal surface and make the graduations very legible.

In our copending application Serial No. 79,372 filed May 12, 1936, (now issued as Patent No. 2,171,504 on August 29, 1939) with reference to which this invention is a continuation in part, we have described and claimed a new measuring tape and similar products which are basically strips of metal, usually in the form of tapes, having elevational differences according to the pattern of, for example, numerals and graduations, where the graduations and numerals may be relatively elevated with reference to the background or vice versa and the relatively depressed portions are filled with a pigmented coating to substantially the level of the raised metallic graduations to provide legible contrast between the numerals and graduations and the background.

In the aforesaid application there is also set forth a method for producing such tapes. The present application is particularly directed to such methods and apparatus for carrying out the methods for producing the tapes.

It is an object of this invention to provide a process and apparatus for making a highly legible metal strip having permanent graduations or indicia contrasting with the background. Permanent graduations refer herein to those articles in which elevational differences of the metal define graduations. The elevational differences may be produced by etching to remove some of the metal originally forming the strip or by adding metal according to a pattern by electroplating, spraying or the like. Further treatment is necessary to make the permanent graduations highly legible.

Another object of the invention is to provide a process for preparing a highly legible coated etched tape by applying a pigmented coating material to a previously etched tape having permanent graduations to substantially fill only the depressed areas and firmly bond with the metal strip to furnish legible contrast with elevated areas.

An important object of the invention is to provide a process for coloring the depressed areas of a metal strip, one surface of which has areas of different elevations which comprises applying a pigmented coating composition to form a layer over substantially the entire said surface, partially setting the pigmented coating composition, removing the partially set pigmented coating composition from the elevated areas of said surface, and further setting the pigmented coating composition in the depressed areas of said surface.

A particular object resides in providing a process for preparing a highly legible graduated metal tape comprising applying an etch resist to those portions of one surface of a strip of metal which are to represent indicia, etching the strip to provide depressions in those areas which are exposed and relatively elevated areas where the resist was applied, removing the etch resist and products of the etching, treating the strip to make it corrosion resistant and to color at least the unetched areas, applying a pigmented coating material as a substantially uniform layer over said surface, partially setting the pigmented coating material, removing the pigmented coating material from the elevated areas and hardening the pigmented coating material retained in the depressions.

It is also an object to provide an apparatus for preparing coated metal tapes with permanent indicia comprising a pivoted member having a sharp edge and means for drawing a strip of metal having relatively elevated and relatively depressed areas coated with a pigmented coating material past the sharp edge to remove the pigmented coating material from the elevated areas.

To secure the above and other related objects which will be hereinafter specifically set forth or apparent, the invention is described as to certain preferred embodiments by reference to the accompanying drawings in which:

Figures 1, 2 and 3 are views in elevation diagrammatically illustrating the steps of one of the processes and certain of the apparatus useful in carrying out the invention;

Figures 4 to 9 and Figures 4a to 9a are plan and side elevation views, respectively, of apparatus for partially stripping an applied coating according to step IX illustrated in Figure 2;

The invention will be particularly described with reference to measuring tapes which are usually constructed from high carbon steel and are relatively long metallic ribbons. It will be evident, however, that the invention is applicable not only to measuring tapes but to other metallic strips which carry indicia for various purposes and include the indicating strips on leveling and stadia rods.

The metal strip to be treated in accord with the teachings of this invention may be of any desired width and the length is usually dependent upon the ultimate purpose for which the strip is prepared and may be several times as long as a single unit. The invention is applicable to relatively short strips which may be handled individually or a long strip may be employed which, after the completion of the process, is cut to appropriate lengths for the purpose desired. In the case of measuring tapes, commonly made in fifty and one hundred foot lengths, a coil of high carbon spring steel usually a strip several hundred feet long may be mounted on a shaft to serve as a supply roll as illustrated in Figure 1. If desired, a plurality of strips may be mounted adjacent each other and the several strips processed simultaneously. Illustrated in Figure 1 is only a single strip but it will be evident that a plurality can be processed together in the manner shown.

Figure 10:
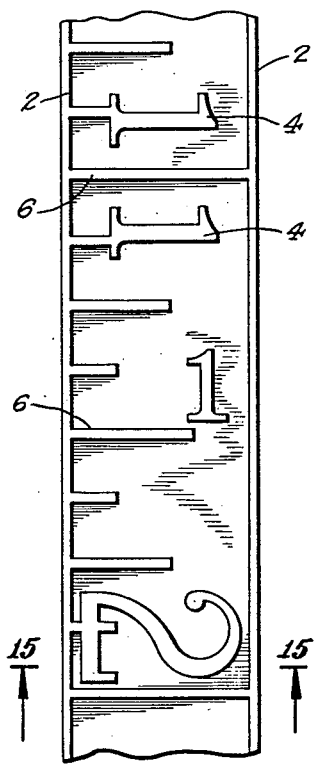
Figure 10 is a view in plan of a finished tape showing one modification of a product formed by practicing the process herein described.
Figure 11:
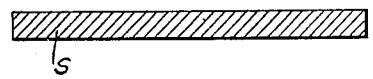
Figures 11 through 16 are views in section taken generally along the line 15—15 of Figure 10 illustrating the development of a tape through the various steps of the process.

The resilient strip S as drawn from the supply roll usually is covered with a layer of an oily or greasy material which protected the metal from corrosion. This may be removed conveniently by a process for chemically cleaning the tape indicated as step I in Figure 1 in which the strip S is passed through a bath of an alkali cleaner which may be a solution of caustic soda, trisodium phosphate, potassium carbonate or the like or mixtures of these alkaline materials. Leaving the first bath, the tape is washed with water to remove the alkali and passed into another tank preferably containing a solution of an alkali metal cyanide that is effective for removing any oxide which might have been formed on the strip. When this solution has been washed from the tape it may be characterized as chemically clean (see Figure 11). Alternatively, or in addition to the cleaning treatment described, the metal strip may be exposed to solvents or solvent vapors as by passing the strip above a bath of heated trichloroethylene and below cooling coils which condense the trichloroethylene vapors causing the condensed solvent to wash the strip.

At the completion of the cleaning operations, the strip is then ready to receive a temporary coating which, as shown in step II of Figure 1, is only a partial coating over those areas which are ultimately to represent the numerals and graduations. Alternatively, the coating may be applied to the background leaving the numerals and graduations unprotected. It may even be advisable to apply this coating to the edges and the back of the strip although normally this is not necessary.

The described temporary coating is preferably that which is known as a resist and is used in a form generally resembling an ink including in its composition a pigmenting material, as for example, carbon black, a fluid material, as for example, linseed oil, and a material resistant to the action of acids, namely an asphalt. Other resist compositions can also be employed which will protect the metallic surface from the action of an etching bath. The resist is applied in the usual manner for making etched tapes either by printing each foot or other unit individually or in a continuous manner.

After the coating has been applied to the desired areas, the strip is passed through a dryer to dry or set the resist which completes step II and the strip is then passed into an etching bath for step III. An etching bath found useful for the treatment of high carbon steel tapes is one containing about 1400 cc. of nitric acid in about 100 gallons of water. The rate of travel of the tape through the etching bath and the time of exposure is controlled to produce the desired depth of etch. If the original strip were .012 inch thick as in steel measuring tapes, the etching can be continued until the depth of the etch is from about .0015 to .002 inch which will provide sufficiently deep depressions for the reception and retention of the pigmented coating material as hereinafter described.

When the etching step III has been carried to the extent desired, the strip is removed from the bath and passed into water (step IV) for diluting of the etching acid and stopping of the action. During the etching operation, those portions of the strip accessible to the acid will become covered with ferroso ferric oxide, generally black in color, which must be removed to expose clean metal and to obtain its removal, the strip must be continuously kept wet after it leaves the etching bath until this oxide is removed otherwise it will firmly attach itself to the base metal. In step V the oxide and also the etch resist are removed by mechanical brushing, wiping or other cleaning of the exposed surfaces while keeping the strip wet. Step V may also include as a modification passing the strip from the cleaning operations to a hydrochloric acid pickling bath maintained at 150° F. for a short interval to brighten the strip.

Figure 12:
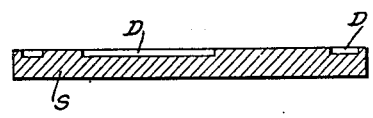

At the conclusion of step V the strip, now provided with permanent graduations and numerals, is generally similar to a conventional etched tape and both the unetched and etched areas have a metallic luster but of different types. In cross-section the strip would have the appearance of Figure 12.

Surface conditioning step VI performs a dual function in first, providing a non-metallic surface for the unetched portions which will later contrast with the pigmented coating material filling the etched recesses and second, protecting the etched recesses from corrosion while at the same time providing a surface to which the pigmented coating material can firmly bond.

According to one of the preferred methods, the etched strip is passed into a bath containing phosphate salts which bath is maintained at about 210° F. and the strip kept in the bath for from about one-quarter to about one-half a minute. The action of the bath is to form a relatively black surface on the entire strip. Preferably, thereafter the strip is rinsed with water and then passed into a bath containing chromic acid with or without an activating agent such as sodium chloride. This bath is kept at about 180° F. and the strip exposed for from about two to six minutes. The combined treatments of the phosphate salts and the chromic acid form a protective coating against corrosion and also provides a surface to which the pigmented coating material will firmly adhere.

An alternative treatment for step VI includes coating the strip with a mineral oil of lubricating body after which the strip is heated sufficiently to oxidize the oil but under conditions which will not destroy the temper of the strip. This likewise colors the strip and prepares the surface for the reception of the pigmented coating material. Other methods for coloring metallic surfaces described hereinafter may be used in step VI.

Figure 13:
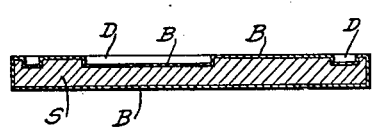

When step VI, according to any of the foregoing modifications, is completed, the strip is thoroughly dried preparatory to receiving the pigmented coating material and may pass directly to the coating apparatus or may be rewound on a wind-up roll as illustrated in Figure 1. The strip with permanent indicia and the colored surface is shown in Figure 13, the colored surface being designated B.

Figure 2 illustrates the coating process. The strip S, prepared as described in connection with the description of Figure 1, is withdrawn from a supply roll by a feed roller which provides a constant rate of feed for the strip there being simply a drag on the supply roll and a friction drive for the rewind roll. The coating is now applied at least to the face of the tape which was etched or otherwise treated to provide the elevational difference between the graduations or numerals and background. The particular coating device for step VII illustrated in Figure 2 has a dip roll which picks up pigmented coating material from a bath and, travelling in the opposite direction to the strip, applies the coating to the entire face of the strip as a layer of substantially uniform thickness which follows generally the contour of the strip.

Figure 14:
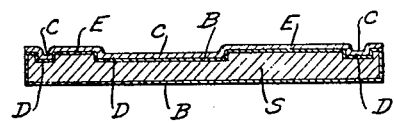
Figure 15:
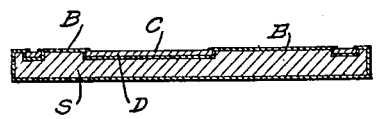

Referring to Figure 14 which is a view in cross-section of a strip coated as in step VII of Figure 2, it will not be noted that the strip S has three depressions D substantially filled with the coating material C which rises almost to the level of the elevated surfaces E. It is important that the amount of pigmented coating material applied be such that the exposed face of the coating material in the recesses or depressions shall not extend above the elevated portions E.

The pigmented coating material according to one of the preferred embodiments of this invention is a lacquer type which is basically a synthetic resin such as a vinyl resin, alkyd resin, urea formaldehyde resin or the like with or without drying oils but preferably containing a cellulose ester such as nitrocellulose all dissolved in suitable solvents and may include metallic dryers. Suitable finely ground pigments or other color producing agents which are referred to herein as pigments are, of course, included. The inclusion of the nitrocellulose appears to cause a rapid preliminary set for the coating material while the resinous materials dry more slowly and usually require baking for a permanent set. The important functions of these properties will be apparent in the discussion of step IX.

It has been found that a coating composition which fills the requirements heretofore set forth is a pigmented, synthetic resin, cellulose ester, coating composition in which the resin may be any of the well known types, as for example, phenol formaldehyde, alkyd, etc., either normal or modified with oils, as for example, drying oils. One of the preferred compositions which has been successfully employed, has the following composition:

| | Per cent |
|---|---|
| Solid alkyd, vinyl or phenol aldehyde resin, oil modified, about | 20 |
| Cellulose ester (plasticized) about | 7 |
| Pigments, such as titanium oxide, titanox B, zinc sulphide, antimony oxide, titanated lithopone, about | 33 |
| Solvent, approximately | 40 |

The solvent, based on the total composition, may comprise about 30% of aliphatic petroleum hydrocarbon such as mineral spirits with about 10% of aromatic hydrocarbons, as for example, turpentine, turpene, dipentine, toluol, benzol, xylol and the like.

The composition should preferably also include metallic dryers, such as oil soluble salts of cobalt, manganese and lead in the proportion of a fraction of a percent of the solid resin.

It has been found that coating compositions of the type above described are particularly useful for forming the ground or base coat. When a phenol aldehyde resin is employed, the coating will, of course, be thermal setting, and the subsequent treatment should involve baking the composition so as to permanently set it and bond it to the metal. While the above described compositions have been found most suitable, it is possible to make certain modifications in this composition, within the skill of those in this art, without departing from the spirit and scope of this invention.

Instead of applying the coating material to only the one face of the strip, it might be applied uniformly to the strip as by spraying, dipping in a bath of coating material or the like. After the coating has been applied to one or both faces the strip is exposed to air or passed through a dryer to provide a preliminary set to the material for step IX. The temperature of the dryer or the time of travel between the coating step VII and stripping step IX will vary according to the solvents employed in the coating material and other properties of the coating composition but it has been found that from ten to fifteen minutes of air drying is sufficient in many instances. Where the back of the strip is not protected by the pigmented coating material the strip may be passed over spaced electrodes and heated by the internal resistance of the metal.

The strip, after the preliminary drying, carries a partially set coating on at least the one side which has the appearance in cross-section as shown in Figure 14. In the modification illustrated in Figure 2 the stripping step IX involves drawing the strip across a stationary or oscillating stripping knife which is a metallic member constructed of tool steel or a hard alloy such as tungsten carbide and provided with a relatively sharp edge. This is held against the tape as by suitable weights and the tape may be supported therebeneath by a semiresilient material. As the tape is drawn under the stripping knife, the sharp edge of the knife engages the elevated surfaces of the coated strip and removes the coating material to expose the colored surfaces C produced in step VI and thereby provide the legible contrast between the pigmented coating material and the normal or colored metallic surface. Means may be positioned adjacent the stripping blades to spray a stream of water or air on the tape thereby removing the stripped coating as it is scraped off the elevated areas. Suction will also serve or a stream of water may be directed at the tape just after it leaves the knife.

One of the tapes prepared according to the teachings of our copending application Serial No. 79,372 filed May 12, 1936, is provided with a longitudinal bead 2 along each edge which may serve as a guide for the stripping knife as the tape is drawn underneath it. This is not, however, essential as the stripping knife can be so mounted as to strip the elevated numerals 4 and graduations 6 without the benefit of the longitudinal beads 2. It will be realized that the operation is the same when the background is relatively elevated and the numerals and graduations form the depressions. The stripping knife does not affect the surface of the pigmented coating material in the depressions D, Figure 14, because the exposed surface of the coating material in the depressions is preferably below the elevated surfaces. As the coating material dries during the preliminary set, there is a glossy surface on the coating material which is maintained because the stripping knife does not come into contact with this surface.

Figure 16:
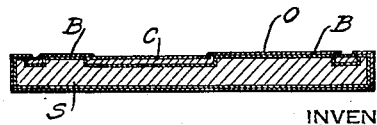

When the stripping action of step IX has been completed, a final set is given to the coating by passing the strip through a dryer where the coating may be baked if such action is advantageous with the particular coating material employed. The tape, at the conclusion of step X may be considered complete and arranged on the wind-up roll but preferably is given an overcoating of a clear lacquer in the manner illustrated in Figure 3. In this case, the printed strip is passed through a bath of a clear lacquer in step XI and then through a dryer in step XII to dry the lacquer and set the finishing coat O (Figure 16) after which the complete tape is wound on a roll or cut to suitable length according to the indicia which had been placed thereon.

The composition of the overcoat is preferably of the type known as lacquer and should be clear, or at any rate, transparent. A composition suitable for this purpose has the following ingredients:

| | Parts by weight |
|---|---|
| ½ second R. S. nitrocellulose | 14 |
| Dibutyl phthalate (plasticizer) | 4.65 |
| Secondary amyl acetate (solvent) | 25 |

Various additional solvents, diluents, partial solvents and even non-solvents, comprising alcohol, amyl alcohol, ethyl acetate, toluol, mineral spirits, etc. to make 100 parts of lacquer.

The lacquer may be thinned by relatively decreasing the proportions of the cellulose ester and plasticizer to the solvents and diluents.

This lacquer is particularly useful as a top coat in this process, since after the pigmented coating has been set and dried, it will not redissolve when the lacquer is applied. If the lacquer contains solvents which, under the conditions of application will redissolve the pigmented coat, it would run and cover other portions of the strip, reducing the accuracy of the visible graduations as well as making them indistinct. Alternatively, the pigmented coating, when baked or otherwise made insoluble, does not limit the selections of solvents for the top coating.

A number of modifications of the basic method involving omission, rearrangement and substitution of steps can be also used. Step I in all instances requires a treatment which will prepare the metal strip for the subsequent operations and to this end any procedure which will provide a substantially chemically clean surface is required.

Instead of immediately applying the resist to the surface of the strip a pretreatment may be employed to color the surface of the strip which coloring will be carried through the process and appear in the elevated portions of the strip in the final product. For example, after the strip has been cleaned it may be passed into a bath containing 750 grams of caustic soda and 250 grams of sodium nitrite per litre of water which will produce what is known as a hydroxide black provided the treatment is carried out for about ten or fifteen minutes while the bath is maintained at about 110° C. to 140° C.

Instead of this treatment the entire exposed surface of the strip may be colored by the burned oil treatment described above or by electroplating black nickel or black chromium. The former method produces a black coating in situ the composition of which is about 52% of nickel, 7½% zinc, 14% sulphur and the remainder oxides. Such a black nickel coating is not corrosion resistant largely because it is porous and does not form a continuous sealing coating. To obtain a black chromium finish the strip is electroplated in a standard chromium electroplating bath containing an organic acid using a high current density with a low temperature bath. The coating, which is hard and corrosion resistant, is approximately 75% of chromium, and 25% of chromium oxide.

A further method for preliminarily coloring the strip which can also be used after the etching step in the process above described is that used for blueing gun barrels and the like. This is attained by applying to the metal a composition of ferrous chloride 70 grams, ferric chloride 10 grams and 2 grams of perchloride of mercury per litre of water and heating the metal to 100° C. for thirty minutes followed by boiling in water for another thirty minutes. The black finish produced by etching with nitric acid may also be used to color the ultimately elevated portions of the strip by first etching the entire strip lightly with a nitric acid etching bath. After washing the etching solution, printing the strip with the etch resist then drying, those portions which are protected by the etch resist having been dried, are permanently attached to the surface and when the primary etching is conducted these areas are unaffected even when the strip is finally cleaned to remove the resist and the similar black deposit produced by the primary etching because in the latter case the black deposit is never permitted to dry and is accordingly readily removed.

Even in those cases where the entire strip is colored in any of the ways described before the etching process proper, the etched portions are preferably subjected to the process of step VI to make the depressed portions resistant to corrosion and to improve the receptiveness of the surface for the pigmented coating.

In some instances, it may be desirable to color the elevated portions of the strip other than by the chemical treatments described which produce corrosion resistance and, incidentally or coincidentally, color. To this end a pigmented lacquer including as its base a synthetic resin, or a cellulose ester or even an oleo-resinous base may be applied uniformly over the etched strip as a very thin coating by spraying, roller application or immersion. When the elevated portions of the strip are those representing numerals and graduations conveniently, the preliminary coating applied may be black especially where the final coating which fills the recesses is white. In applying this preliminary coating great care should be exercised that only a thin film is deposited and the depressions are not filled with this primer coating. After the primer coating has been adequately dried and set, either by air drying or baking or the like, a further coat of pigmented coating material of contrasting color is then applied which will fill the recesses substantially to the level of the elevated portions which now include the first coating. After this second coat has been partially dried, the tape should be subjected to stripping step IX to remove only the second coating leaving the hardened primer unaffected on all portions of the strip. When the second coat is finally set, the entire strip may be coated with a clear protective lacquer or the like.

Instead of applying the contrasting color to the elevated portions before the application of the principal coat of pigmented coating material, it may be applied later or the colors produced during treatment with corrosion resisting materials may be improved by completing the tape in the manner above described through the hardening of the pigmented coating material which substantially fills the depressions followed by electroplating the strip in a bath which will produce a black nickel coating or a black chromium coating. As the pigmented coating material serves as an insulation, the electro deposited color will occur only at the uncoated elevated areas which are the only areas at which the black color is desired, assuming that the pigmented coating material filling the depressions is light in color such as white.

Color contrasts of black and white have been specifically described but other colors including yellow, orange, green, purple, red, etc. may be used in contrasting combination.

Figures 4 and 4a to 9 and 9a show various devices for removing the excess of the pigmented coating material that is applied as a more or less uniform layer to at least one side of the strip. As shown in Figures 4 and 4a the strip S travels under a series of blades 10, 12 and 14 which have sharpened edges 16, 18 and 20. The sharpened edges are preferably arranged at an angle of substantially 45° with the edge of the tape to assist in the stripping action and the blades are pivoted at their upper ends on axes 22, 24 and 26 which are parallel with the sharpened edges 16, 18 and 20. In some cases it may be advisable to provide a mechanism which will oscillate the blades along a line parallel to the axes 22, 24 and 26 thereby assisting in the stripping action. As illustrated in Figure 4a, the tape beneath the blade 10 acts on the unsupported tape and its effect depends upon the tension on the tape. While beneath the blade 12, the tape is supported on a semiresilient support conveniently rubber, 28, and this type of support may be used under each of the blades if desired. With some types of pigmented coating materials, a single blade may be sufficient although it is usually preferable to employ at least two blades set at opposite angles to each other to insure complete removal of the pigmented coated material from the elevated portions.

The blades 10, 12 and 14 may be constructed of any material but are preferably of tool steel or hard alloys, as for example, tungsten carbide and in the interests of economy only the blades near the cutting edges need be of such materials. If the materials from which the blades are constructed are not of sufficient weight, provision should be made for applying additional weight which is effective to hold the sharp edge of the blade uniformly in contact with the surface of the strip. The means provided should accommodate various weights or permit the application of varying forces in accord with the condition of the coating material to be removed.

Figures 5 and 5a show a stripping blade generally similar to those illustrated in Figures 4 and 4a except that the blade 30 is mounted beneath the tape and means supplied for forcing the cutting edge against the underside of the strip. In this case the underside of the strip would be the one having the relatively elevated and depressed portions and at least that side would carry the pigmented coating material. As in the other instances, the coating might have been applied to both sides and the edges.

In the modifications illustrated in Figures 4 and 5 the blade pivots with reference to the travel of the tape were behind the cutting edge. In Figure 6, a stripping blade is illustrated in which the axis 40 is situated at a point in the travel of the strip S before the strip reaches the sharpened edge 42 which provides a somewhat different action for the cutting edge 42. A suitable support such as that identified as 28 in Figure 4a may be positioned beneath the strip S adjacent the cutting edge 42 and a weight W or other force applied to urge the cutting blade against the strip.

A device generally resembling a milling cutter may also be used to strip the coating material from the elevated portions of the strip as illustrated in Figure 7 wherein a cylindrical wheel 50 is provided with transverse teeth 52 which are parallel to the axis of the wheel. The teeth 52 may be spiral instead of straight.

A rotary frusto-conical member 60, illustrated in Figure 8, may be mounted for rotation on a shaft 62 upon a support 64 in such a manner that when the strip 8 is drawn between the sharpened edge 66 of the frusto cone 60 and the plane surface 68 of the support 64 the coating material will be stripped off.

Step VII which is the step of applying the principal coating material which substantially fills the depressions followed by step VIII in which this material is partially set produces a coating which has a relatively glossy surface and looks hard although it would be considered soft to the finger nail and can be stripped from the metal surface to which it was applied. At this time of partial setting, it is possible to remove the coating by exposure to frictional action with a partial solvent such as ethylene glycol monomethyl ether, denatured alcohol or carbon tetrachloride. What is a semisolvent will depend upon the composition of the coating material and should be selected because it is a solvent for one of the solids in the composition although preferably not for both, in those cases where there are two types of solids. In Figure 9 is illustrated an apparatus for removing the pigmented coating material from the elevated portions of the strip by dissolution. The apparatus there illustrated comprises a cylindrical drum 10 dipping into the solvent liquid 72 and rotating in a direction opposite to the travel of the strip S. The drum 10 should be constructed of such material as will permit a surface adsorption of the semisolvent which produces a scrubbing action effect principally on the elevated portions of the strip and removes the coating from this area. A knife or doctor blade 74 can be used with some types of cylinder 70 to scrape the coating material carried by the drum after it has been removed from the strip. If the surface of the drum 70 is sufficiently rigid, it will have substantially no effect on the pigmented coating material carried in the depressions.

The various means illustrated in Figures 5 to 9 will remove pigmented coating material from the elevated areas of the strip without removing that deposited in the depressions thereby producing the contrast between the pigmented coating material in the depressions and the elevated areas which may be colored or natural metallic surfaces produced in any of the ways described.

It will thus be evident that there is provided by this invention a process and apparatus useful in the process for the production of metal strips having elevational differences and provided with pigmented coating materials in the depressions to contrast with the elevated areas.

While this invention has been described as to certain preferred embodiments thereof, these are to be considered as illustrative of the invention and not in limitation of it, the scope of the invention being set forth in the appended claims.

What is claimed is:

1. In the process of making a graduated strip-like measuring device, the creation of a highly legible contrast between the background area and the indicia area of a surface of a steel strip whereof one of said areas is relatively depressed and the other area is relatively elevated, in combination, the steps of applying a pigmented coating composition capable of a preliminary partial set and a subsequent permanent set to form a layer over substantially the entire said surface, partially setting the pigmented coating composition, removing the partially set pigmented coating composition from the elevated areas of said surface, and permanently setting the pigmented coating composition in the depressed areas of said surface.

2. In the process of making a graduated strip-like measuring device, the creation of a highly legible contrast between the background area and the indicia area of a surface of a steel strip whereof one of said areas is relatively depressed and the other area is relatively elevated, in combination, the steps of coloring the said surface of the strip and applying a pigmented coating composition capable of a preliminary partial set and a subsequent permanent set to form a layer over substantially the entire said surface, partially setting the pigmented coating composition, removing the partially set pigmented coating composition from the elevated areas of said surface, and permanently setting the pigmented coating composition in the depressed areas of said surface.

3. In the process of making a graduated strip-like measuring device, the creation of a highly legible contrast between the background area and the indicia area of a surface of a steel strip whereof one of said areas is relatively depressed and the other area is relatively elevated, in combination, the steps of treating the strip to make it corrosion resistant and to color at least the relatively elevated areas, applying a pigmented coating material capable of a preliminary partial set and subsequent hardening as a substantially uniform layer over said surface, partially setting the pigmented coating material, removing the pigmented coating material from the elevated areas and hardening the pigmented coating material retained in the depressions.

4. The process for preparing a highly legible graduated metal tape comprising uniformly coloring a strip of metal, applying an etch resist to those portions of one surface of the strip of metal which are to represent indicia, etching the strip to provide depressions in those areas which are exposed and relatively elevated areas where the resist was applied, removing the etch resist and products of the etching, treating the strip to make it corrosion resistant, applying a pigmented coating material capable of a preliminary partial set and subsequent hardening as a substantially uniform layer over said surface, partially setting the pigmented coating material, removing the pigmented coating material from the elevated areas and hardening the pigmented coating material retained in the depressions.

5. The process for preparing a highly legible graduated metal tape comprising lightly etching a strip of metal to change the characteristic metallic lustre, applying an etch resist to those portions of one surface of the strip of metal which are to represent indicia, etching the strip to provide depressions in those areas which are exposed and relatively elevated areas where the resist was applied, removing the etch resist and products of the etching, treating the strip to make it corrosion resistant, applying a pigmented coating material capable of a preliminary partial set and subsequent hardening as a substantially uniform layer over said surface, partially setting the pigmented coating material, removing the pigmented coating material from the elevated areas and hardening the pigmented coating material retained in the depressions.

6. In the process of making a graduated strip-like measuring device, the creation of a highly legible contrast between the background area and the indicia area of a surface of a steel strip whereof one of said areas is relatively depressed and the other area is relatively elevated, in combination, the steps of treating the strip to make it corrosion resistant, applying a thin coat of a first pigmented coating material to at least said surface, hardening said coat, applying a uniform coat of a second pigmented coating material to said surface, said second pigmented coating material being of a legibly contrasting color to said first pigmented coating material and removing the said second pigmented coating material from the relatively elevated areas to expose the contrasting first pigmented coating material.

7. In the process of making a graduated strip-like measuring device, the creation of a highly legible contrast between the background area and the indicia area of a surface of a steel strip whereof one of said areas is relatively depressed and the other area is relatively elevated, in combination, the steps of treating the strip to make it corrosion resistant, applying a pigmented coating material capable of a preliminary partial set and subsequent hardening as a substantially uniform layer over said surface, partially setting the pigmented coating material, removing the pigmented coating material from the elevated areas, hardening the pigmented coating material retained in the depressions and coloring the elevated areas on said surface of the strip.

8. An apparatus for continuously preparing coated metal tapes with permanent indicia comprising means for preparing a strip of metal with relatively elevated and relatively depressed areas according to the pattern of indicia, means for applying a substantially uniformly thick layer of a pigmented coating material, means to partially set the pigmented coating, means to remove the partially set pigmented coating material from the relatively elevated areas, and means to subsequently harden the partially set coating material.

9. An apparatus for preparing coated metal tapes with permanent indicia comprising means for etching a steel strip according to the pattern of indicia to provide relatively elevated and relatively depressed areas, coating means for applying a substantially uniformly thick layer of a pigmented coating material on the elevated areas of the strip and in the depressed areas, means to remove the pigmented coating material from the relatively elevated areas whereby the depressed areas remain filled with the coating material to the level of the elevated areas, and means to substantially harden the partially set coating material.

10. In apparatus for preparing coated metal measuring tapes with permanent indicia, in combination, a pivoted member having a sharp edge and means for drawing a flexible strip of metal having relatively elevated and relatively depressed areas coated with a pigmented coating material past and in contact with the sharp edge to remove the pigmented coating material from the elevated areas.

11. An apparatus for preparing coated metal tapes with permanent indicia comprising means for applying a pigmented coating material to the surface of a flexible strip of metal having relatively elevated and relatively depressed areas, means for partially setting the pigmented coating material, means for removing the pigmented coating material from the relatively elevated areas and means to permanently set the pigmented coating material in the relatively depressed areas.

12. Apparatus for preparing coated metal measuring tapes with permanent indicia comprising means for applying a pigmented coating material to the surface of a flexible strip of metal having relatively elevated and relatively depressed areas, means for partially setting the pigmented coating material, a pivoted member having a sharp edge and means for drawing said flexible strip past the sharp edge to remove the pigmented coating material from the elevated areas.

13. Apparatus for preparing coated metal measuring tapes with permanent indicia comprising means for applying a pigmented coating material to the surface of a flexible strip of metal having relatively elevated and relatively depressed areas, means for partially setting the pigmented coating material, a pivoted member having a sharp edge, means for drawing said flexible strip past the sharp edge and means to yieldingly support the strip in contact with the said edge to remove the pigmented coating material from the elevated areas.

14. Apparatus for preparing coated metal measuring tapes with permanent indicia comprising a member having a sharp edge, means for moving a flexible strip of metal having relatively elevated and relatively depressed areas coated with a pigmented coating material past the sharp edge to remove the coating material from the elevated areas and means to pivotally support said member with its sharp edge at an angle to the direction of travel of the strip of metal.

15. An apparatus for the continuous preparation of coated metal tapes with permanent indicia comprising means to apply a mask to a flexible metal strip according to the pattern of indicia, means to etch the strip according to the pattern of indicia to provide relatively elevated and relatively depressed areas, coating means for applying a substantially uniformly thick layer of a pigmented coating material to that side of the metal strip having the relatively elevated and depressed areas, means to partially set the pigmented coating material, means to remove the pigmented coating material from the relatively elevated areas and means to subsequently harden the partially set coating material.

16. In the process of making a graduated strip-like measuring device, the creation of a highly legible contrast between the background area and the indicia area of a surface of a steel strip whereof one of said areas is relatively depressed and the other area is relatively elevated, in combination, the steps of applying a pigmented coating composition which gives a preliminary partial set and a subsequent set over the entire said surface, partially setting the pigmented coating composition, scraping the partially set pigmented coating composition from the elevated areas of said surface and then permanently setting the pigmented coating composition in the depressed areas of said surface.

17. In the process of making a graduated strip-like measuring device, the creation of a highly legible contrast between the background area and the indicia area of a surface of a steel strip whereof one of said areas is relatively depressed and the other area is relatively elevated, in combination, the steps of treating the said surface of the strip with a reactant for the metal to provide a surface having a color different from the normal metallic color of the strip, applying a pigmented coating composition of a color contrasting with the said different color to the entire said surface of the strip and removing only the pigmented coating composition from the said different colored surface on the elevated area to provide legible contrast between the indicia and background.

18. In the process of making a graduated strip-like measuring device, the creation of a highly legible contrast between the background area and the indicia area of a surface of a steel strip whereof one of said areas is relatively depressed and the other area is relatively elevated, in combination, the steps of treating the said surface of the strip with an inorganic reactant for the metal to reduce corrosion, to make the strip receptive to pigmented coating composition and to provide a surface having a color different from the normal metallic color of the strip, applying a pigmented coating composition of a color contrasting with the said different color to the entire said surface of the strip and removing only the pigmented coating composition from the said different colored surface on the elevated area to provide legible contrast between the indicia and background.

ADOLF W. KEUFFEL.
HOWARD F. SCHERMERHORN.